May 30, 1933. H. J. LUFF ET AL 1,911,455
REMOVABLE CLOSURE
Filed March 9, 1929

INVENTOR.
Henry J. Luff,
Lawrence W. Luff and
Willard J. Luff
BY
Fay, Oberlin & Fay
ATTORNEYS Patented May 30, 1933

1,911,455

UNITED STATES PATENT OFFICE

HENRY J. LUFF, LAWRENCE W. LUFF, AND WILLARD J. LUFF, OF CLEVELAND HEIGHTS, OHIO; SAID HENRY J. LUFF AND LAWRENCE W. LUFF ASSIGNORS TO SAID WILLARD J. LUFF

REMOVABLE CLOSURE

Application filed March 9, 1929. Serial No. 345,784.

The present invention relates, as indicated, to closures for pipes, and the like, and the primary object thereof is to provide a pipe closure for openings in pipes or other containers. Further objects will appear as the description proceeds. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
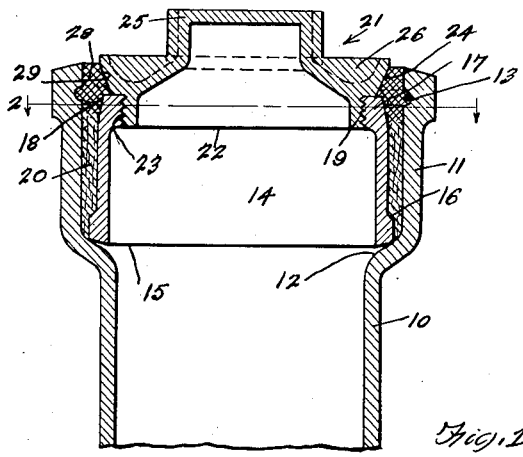
Figure 3:
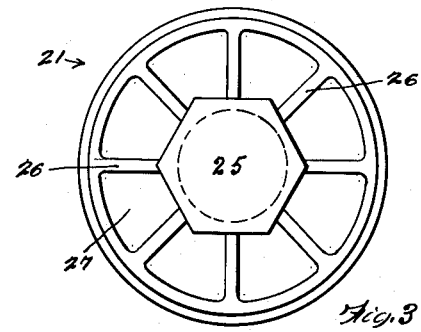
Figure 2:
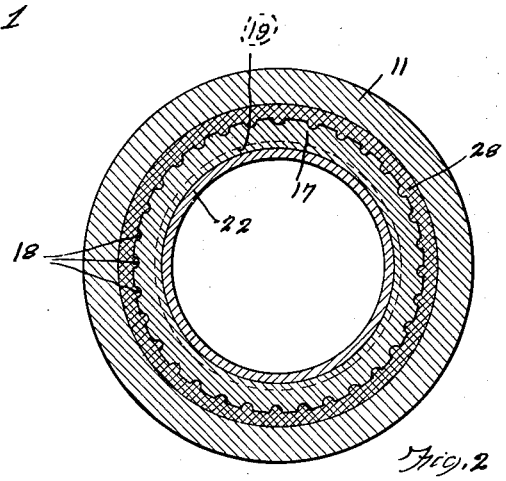
Figure 4:
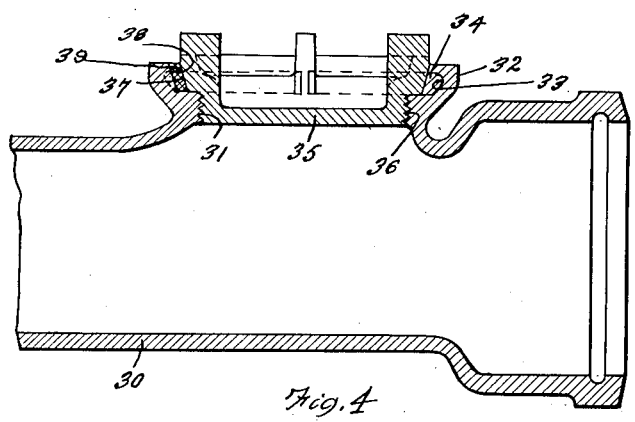

In said annexed drawing:

Fig. 1 is a vertical section through an open pipe end showing one embodiment of the closure of the present invention installed therein; Fig. 2 is a transverse section taken substantially upon the line 2—2 of Fig. 1; Fig. 3 is a plan view of the plug; and Fig. 4 is a section showing another embodiment of the present invention.

Referring more particularly to the drawing, it will be seen that, in Fig. 1, there is illustrated a pipe 10 having an enlarged end 11 forming an internal shoulder 12. Said end 11 is formed adjacent its extremity with an annular groove 13 for a purpose to be described.

A cylindrical ferrule 14 having an external diameter substantially less than the internal diameter of the pipe end 11 is entered in said end and its lower end 15 is adapted to rest upon said shoulder 12. Said end 15 is formed with an external shoulder 16 for a purpose to be described, and the opposite end 17 of said ferrule is externally formed with a plurality of longitudinally extending grooves 18, as shown in Figs. 1 and 2, and is internally threaded as at 19. In order to retain said ferrule in said pipe end, the space between the ferrule and the wall of the pipe end is tightly packed with oakum, indicated at 20, which overlies the shoulder 16 as is clearly shown in Fig. 1.

The reference numeral 21 indicates generally a closure plug, the inner end 22 of which is threaded as at 23 for engagement with the threads 19 of the ferrule 14. As shown, said plug is formed with a flared surface 24 adapted to be disposed outwardly of said ferrule 14 and flaring from its inner to its outer end, at a substantial angle to the ferrule axis, about 25° being shown in Fig. 1. As shown, the plug is formed with a polygonal head 25 for engagement by a wrench and with a plurality of radial ribs 26 forming sockets 27. It will be understood that the head 25 may be eliminated, and that the plug may be rotated by means of a tool engaged with the ribs 26.

In assembling the closure for the pipe end, the ferrule 14 is placed in the position indicated and the oakum 20 is forced into place, and thereafter the plug 21 is threaded into the open end 17 of said ferrule and is seated tightly on the upper end thereof. Lead 28, or other similar material, is then calked into the space above the oakum 20, being forced into the grooves 18 and into the groove 13, and being molded against the flared surface 24 of the plug 21 to form an exact fit therewith. Thus, when the calking material hardens the tongues extending into the groove 13 will effectively hold the ferrule 14 against removal from the pipe end, the tongues extending into the grooves 18 will effectively prevent rotation of the ferrule 14 with respect to the pipe end 11, and the surface 29 contacting the flared surface 24 will have all the advantages of a ground seat for said flared surface.

Referring now to the modification disclosed in Fig. 4, it will be seen that a pipe 30 is provided with a lateral internally threaded port 31 surrounded by a flange 32 formed with an annular groove 33. As shown, a plurality of radial ribs 34 divide said groove 33. A plug 35 is threaded as at 36 at its inner end for engagement with the threads 31, and said plug is formed with a flared surface 37, the sides of which form a substantial angle with the plug axis, 15° being shown in the drawing.

In installing the clean-out plug, the plug 35 is screwed into place, and thereafter lead 39, or other similar material, is calked into the space between said flared surface 37 and the flange 32, whereby said calking material enters the groove 33 and is molded against the surface 37 to form an exactly fitting flared seat 38 for said surface.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. A closure unit comprising a ferrule threaded at one end and a removable closure adapted to be threadedly engaged with said ferrule end and formed with a surface flaring outwardly and upwardly from said ferrule, said closure being further formed with a shoulder between said flared surface and the threaded portion thereof, said shoulder lying substantially in a plane normal to the axis of said ferrule.

2. The combination with a tubular element having an enlarged end forming an internal shoulder, of a closure unit comprising a substantially cylindrical ferrule adapted to be entered in said end, a removable closure closing one end of said ferrule, a surface on said removable closure without said ferrule and flared outwardly at least 10° to the axis of said closure, a shoulder on said closure at the base of said flared surface, said closure engaging said end of said ferrule, a series of axial grooves in the upper end surface of said ferrule, an inner circumferential groove in said tubular element opposite said series of axial grooves, and means retaining said ferrule in place and molded to an exact fit with said flared surface, with the outer edge of said end surface, with said notches and with said groove.

3. The combination with a tubular element having a port with a surrounding flange, an internal shoulder within said flange, a removable closure closing said port and engaged therewith, a surface on said removable closure without said port and flared outwardly at least 10° to the axis of said closure, a shoulder on said closure at the base of said flared surface, an inner circumferential groove in said flange and sealing means between said flange and said closure molded to an exact fit with said flared surface.

4. The combination with a tubular element having a screw threaded port, an internal shoulder and a surrounding flange, of a removable closure having a screw threaded portion adapted to be threadedly engaged with said port and having a shoulder and also being formed with a surface flaring outwardly and upwardly from said shoulder, said shoulder being located between said flared surface and the threaded portion of said closure, and lying substantially in a plane normal to the axis of said threaded portion to coact with said first named shoulder, and sealing means between said flared surface and said flange molded to an exact fit with said flared surface.

Signed by us this 1st day of March, 1929.
HENRY J. LUFF.
LAWRENCE W. LUFF.
WILLARD J. LUFF.